US008911652B2

(12) United States Patent
Roedel et al.

(10) Patent No.: US 8,911,652 B2
(45) Date of Patent: Dec. 16, 2014

(54) SYSTEM AND METHOD OF SEALING COIL LEADS DURING ENCAPSULATION

(75) Inventors: Stanley B. Roedel, Budd Lake, NJ (US); Eugene Gaw, Parsippany, NJ (US); Vincent Cole, Rockaway, NJ (US)

(73) Assignee: Automatic Switch Company, Florham Park, NJ (US)

( * ) Notice: Subject to any disclaimer, the term of this patent is extended or adjusted under 35 U.S.C. 154(b) by 702 days.

(21) Appl. No.: 13/225,965

(22) Filed: Sep. 6, 2011

(65) Prior Publication Data

US 2013/0056901 A1    Mar. 7, 2013

(51) Int. Cl.
| | | |
|---|---|---|
| *B29C 45/14* | (2006.01) | |
| *H01F 41/04* | (2006.01) | |
| *H01F 41/12* | (2006.01) | |
| *H01F 41/10* | (2006.01) | |
| *H01F 5/00* | (2006.01) | |

(52) U.S. Cl.
CPC ..... *B29C 45/14639* (2013.01); *B29C 45/14655* (2013.01); *H01F 41/04* (2013.01); *B29C 2045/14131* (2013.01); *B29C 2045/14139* (2013.01); *B29C 45/14426* (2013.01); *H01F 41/127* (2013.01); *B29C 2045/14959* (2013.01); *B29C 45/14491* (2013.01); *H01F 41/10* (2013.01)
USPC .................. 264/272.15; 264/261; 264/272.11; 264/272.19

(58) Field of Classification Search
CPC ............................................. B29C 2045/14139
USPC ....................................... 264/272.15, 272.19
See application file for complete search history.

(56) References Cited

U.S. PATENT DOCUMENTS

| | | | |
|---|---|---|---|
| 2,479,400 A | | 8/1949 | Pecoroni |
| 3,238,286 A | * | 3/1966 | Davis ........................ 264/272.19 |
| 3,451,021 A | | 6/1969 | Atherton |
| 3,626,051 A | * | 12/1971 | Liautaud ................... 264/272.19 |

(Continued)

FOREIGN PATENT DOCUMENTS

| | | |
|---|---|---|
| EP | 1 614 518 | 1/2006 |
| JP | 55033055 | 3/1980 |

(Continued)

OTHER PUBLICATIONS

Rouzier, B., International Search Report for International Patent Application No. PCT/US2012/051473, European Patent Office, dated Nov. 19, 2012.

(Continued)

*Primary Examiner* — Atul P. Khare
(74) *Attorney, Agent, or Firm* — Locke Lord LLP (57) ABSTRACT

A method of sealing coil leads during encapsulation by placing a lead of a coil in a tube, such that there remains a gap between the lead and the tube; placing the coil in a mold such that the gap remains open to an environment surrounding the mold; and injecting encapsulation material into the closed mold in a liquid state under pressure, thereby causing the material to flow through the gap toward the environment. Injecting encapsulation material into the mold may be done at a rate, temperature, and/or environmental temperature to cause the material to solidify before passing through the gap into the environment. In any case, there is no need to seal the mold to the leads. Each lead of the coil may be placed into an individual tube and/or the tubes may be is formed within a single sleeve.

15 Claims, 7 Drawing Sheets

(56) References Cited

U.S. PATENT DOCUMENTS

| | | | |
|---|---|---|---|
| 4,284,312 A | 8/1981 | Patchett | |
| 4,679,767 A | 7/1987 | Vollmer et al. | |
| 4,683,454 A | 7/1987 | Vollmer et al. | |
| 5,226,220 A * | 7/1993 | Gevas et al. | 29/605 |
| 5,331,730 A * | 7/1994 | Brinn, Jr. | 29/606 |
| 6,175,083 B1 | 1/2001 | Palmer | |
| 6,545,583 B1 | 4/2003 | Palmer | |
| 6,737,947 B1 | 5/2004 | Volckmann | |
| 7,151,427 B2 | 12/2006 | Muller et al. | |
| 2001/0003591 A1 | 6/2001 | Kondo | |
| 2001/0003688 A1 | 6/2001 | Kondo | |
| 2002/0175791 A1 | 11/2002 | LaMarca et al. | |
| 2011/0177720 A1 | 7/2011 | Cortes | |

FOREIGN PATENT DOCUMENTS

| | | |
|---|---|---|
| JP | 56062307 | 5/1981 |
| JP | 58161312 | 9/1983 |
| JP | 60001822 | 1/1985 |
| WO | 02/086918 | 10/2002 |

OTHER PUBLICATIONS

Rouzier, B., Written Opinion for International Patent Application No. PCT/US2012/051473, European Patent Office, dated Nov. 19, 2012.

* cited by examiner

SYSTEM AND METHOD OF SEALING COIL LEADS DURING ENCAPSULATION

CROSS REFERENCE TO RELATED APPLICATIONS

None.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to solenoids; and more specifically relate to methods of encapsulating solenoid coils.

2. Description of the Related Art

U.S. Pat. No. 4,284,312 discloses a "sealing type electrical connector with mating housing portions configured to inhibit undesirable seepage of water or other contaminates into its interior which would be detrimental. A first housing is formed of flexible, molded elastomeric material which is relatively soft. A second housing is molded of rigid thermoplastic material. Each housing includes a tubular outer wall with closed and open ends defining a hollow interior therebetween. The housing members each also include an inner plug portion integrally formed therewith and spaced inward from the tubular outer wall portion, each having electrical contact makers molded therein. The tubular wall of one housing member has an inner diameter slightly larger than the outer diameter of the tubular wall of the other housing member so that the members are assembled with the one member overlying the outer wall of the other member. Circumferentially extended sealing ribs on the member of elastomeric material are engaged by the other member and compressed in the space therebetween to prevent passage of water between the housing members and into the interior."

U.S. Pat. No. 4,679,767 discloses a "solenoid arrangement including a coil of electrically conductive wire and a yoke of magnetic material surrounding the coil. The coil is completely encapsulated by a thermosetting resin, the resin being located between the coil and the yoke, and the yoke being encapsulated by a thermoplastic resin. Preferably, the thermosetting resin is an epoxy resin, and the thermoplastic resin is nylon. The yoke includes a side wall extending around the entire periphery of the coil, a top wall, and a bottom wall, the side, top, and bottom walls forming a box-like housing which substantially completely encloses the coil. A stationary armature extends from the top wall of the yoke into the center of the spool upon which the coil is wound, and a sleeve for accommodating a core tube extends from the bottom wall into the center of the spool."

U.S. Pat. No. 4,683,454 discloses a "solenoid actuator including a coil of electrically conductive wire, a yoke of magnetic material surrounding the coil, and a non-electrically and non-magnetically conductive material encapsulating the coil and yoke. A pair of terminals connected to the ends of the coil project outwardly beyond an exterior surface of the encapsulation. Any of a variety of electrical connection modules is adapted to receive the coil terminals and electrically connect them to standard electrical connectors projecting from the module. Different modules have different forms of standard electrical connectors, so that regardless of the type of connector available at the source of electric power, a suitable module can be connected to the encapsulated coil for cooperation with the power source connector. The body of each module is formed of resilient material so that when the module is tightly attached to the coil encapsulation, a seal is formed completely surrounding the coil terminals. Particular modules may incorporate rectifiers, time delay circuits, power-enhancing circuits, and radio controlled switches."

U.S. Pat. No. 6,175,083 discloses a "sealing mechanism is provided to seal a lead from a closed cavity of an apparatus. The sealing mechanism includes a mounting portion sealingly connected to the apparatus, a cap member having a recess defined therein with an elastomeric grommet compressively disposed in the recess. The elastomeric grommet has a passageway defined therethrough for the lead from the closed cavity to past through. The compressive forces induced into the elastomeric grommet applies a compressive force on the lead to provide a seal. The cap member is sealingly connected to the mounting portion. Consequently, the closed cavity in the apparatus is effectively sealed from the atmosphere and contaminants cannot enter the closed cavity and create premature failure of the component therein, such as, for example, an electrical coil."

U.S. Pat. No. 6,545,583 discloses a "sealing mechanism [that] comprises a cap and a grommet for sealing an electrical lead extended from a coil overmold or a closed cavity. The grommet provides a first seal against the electrical lead and a second seal against a mounting section around the electrical lead. The cap is snap-fit onto the mounting portion for the lead through engagement between corresponding snap structures on the cap and mounting portion. The grommet comprises a skirt section and a cover section. The skirt section forms a radial seal against the mounting portion while the cover section seals against the leads."

U.S. Pat. No. 6,737,947 discloses an "electrical assembly that prevents contaminants from migrating to the coil windings within an encapsulant forming the main housing through the use of a sealing assembly located within an over-molded, thermoplastic encapsulant. Before over-molding, an elastomeric seal is installed on each lead wire to be sealed, and this wire/seal subassembly is then inserted into a seal housing made from the same basic thermoplastic as the encapsulant forming the housing. The seal housing has one or more continuous ribs, with sharp edges, that circumvent the outer surface of the seal housing. During over-molding to form the main housing, the molten encapsulant surrounds the seal housing and melts the tips of the ribs. Upon cooling, the (no thermoplastic solidifies and the encapsulant bonds to the seal housing along each of its ribs."

U.S. Pat. No. 7,151,427 discloses a "switchgear, especially for actuating valves, includes a housing (18) and a coil body (10) disposed in the housing. A switch element is guided in the coil body. The coil body is provided with a winding (14) of a conductor (16) that is connected to a plug connector (22) via contact elements (20). At least some sections of the housing (18) and of the plug connector (22) are enclosed by a plastic compound (24). Sealing devices (40) seal off the interior (42) of the switchgear from the surroundings (44). At least one of the sealing devices (40) is configured as a sealing web (48) of a meltable material. The sealing web (48) is disposed on the bottom face (50) of a plug plate (26) of the plug connector (22) which faces the housing (18). The sealing web (48), in the molten connection state, seals off at least the engaging parts of the plug connector (22) that are connected to the housing (18) from the surroundings (44) in a fluid-tight manner by the plastic compound (24), thereby eliminating the need for conventional rubber packing rings (O rings) in the area of the plug connector that are prone to failures."

U.S. Patent No. Application Publication No. 20020175791 discloses a solenoid "that has a fully enclosing yoke with integral end cap and sleeve. A second, separate, or alternatively integral end cap with sleeve is provided to complete the magnetic yoke. The yoke/coil assembly is encapsulated with a liquid crystal polymer that has a melting temperature higher than the melting temperature of the coil bobbin to provide a good bond therebetween."

The inventions disclosed and taught herein are directed to an improved system and method for sealing coil leads during encapsulation.

BRIEF SUMMARY OF THE INVENTION

A method of sealing coil leads during encapsulation which may comprise placing at least one lead of a coil in a tube, the tube having an inner diameter greater than an outer diameter of the lead, such that there remains a gap between the lead and the tube; placing the coil in a mold such that the gap remains open to an environment surrounding the mold; and injecting encapsulation material into the closed mold in a liquid state under pressure, thereby causing the material to flow through the gap toward the environment. Injecting encapsulation material into the mold may be done at a rate, temperature, and/or environmental temperature to cause the material to solidify before passing through the gap into the environment. In any case, there is no need to seal the mold to the leads. Each lead of the coil may be placed into an individual tube and/or the tubes may be formed within a single sleeve. The mold may be sealed to the sleeve or an assembly of which the sleeve is a component.

A method of sealing coil leads during encapsulation which may comprise providing a sleeve having a plurality of longitudinal tubes therein; placing each of a plurality of leads of a coil in each tube, the tubes having an inner diameter greater than an outer diameter of the corresponding lead, such that there remains a gap between each lead and each tube; sealing the coil in a mold such that the gap remains open to an environment surrounding the mold; and injecting encapsulation material into the sealed mold in a liquid state under pressure, thereby causing the material to flow through the gap toward the environment. Injecting encapsulation material into the sealed mold may be done at a rate, temperature, and/or environmental temperature to cause the material to solidify after entering the gap and before passing through the gap into the environment. In any case, there is no need to seal the mold to the leads. The mold may be sealed to the sleeve or an assembly of which the sleeve is a component.

A method of sealing coil leads during encapsulation which may comprise providing an assembly including a threaded collar and a sleeve having a plurality of longitudinal tubes therein; placing each of a plurality of leads of a coil in each tube, such that there remains a gap between each lead and each tube; sealing the coil in a mold around the coil and to the assembly, such that the gap remains open to an environment surrounding the mold; and injecting encapsulation material into the sealed mold in a liquid state under pressure, causing the material to flow through the gap toward the environment, wherein injecting encapsulation material into the mold comprises injecting encapsulation material into the mold at a rate slow enough to cause the material to solidify after entering the gap and before passing through the gap into the environment. The rate may be selected based on an environment temperature and a temperature of the material.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a method of sealing coil leads during encapsulation which may comprise placing at least one lead of a coil in a tube, the tube having an inner diameter greater than an outer diameter of the lead, such that there remains a gap between the lead and the tube; placing the coil in a mold such that the gap remains open to an environment surrounding the mold; and injecting encapsulation material into the closed mold in a liquid state under pressure, thereby causing the material to flow through the gap toward the environment. Injecting encapsulation material into the mold may be done at a rate, temperature, and/or environmental temperature to cause the material to solidify before passing through the gap into the environment. In any case, there is no need to seal the mold to the leads. Each lead of the coil may be placed into an individual tube and/or the tubes may be formed within a single sleeve. The mold may be sealed to the sleeve or an assembly of which the sleeve is a component.

The method may comprise providing a sleeve having a plurality of longitudinal tubes therein; placing each of a plurality of leads of a coil in each tube, the tubes having an inner diameter greater than an outer diameter of the corresponding lead, such that there remains a gap between each lead and each tube; sealing the coil in a mold such that the gap remains open to an environment surrounding the mold; and injecting encapsulation material into the sealed mold in a liquid state under pressure, thereby causing the material to flow through the gap toward the environment. Injecting encapsulation material into the sealed mold may be done at a rate, temperature, and/or environmental temperature to cause the material to solidify after entering the gap and before passing through the gap into the environment. In any case, there is no need to seal the mold to the leads. The mold may be sealed to the sleeve or an assembly of which the sleeve is a component.

The method may comprise providing an assembly including a threaded collar and a sleeve having a plurality of longitudinal tubes therein; placing each of a plurality of leads of a coil in each tube, such that there remains a gap between each lead and each tube; sealing the coil in a mold around the coil and to the assembly, such that the gap remains open to an environment surrounding the mold; and injecting encapsulation material into the sealed mold in a liquid state under pressure, causing the material to flow through the gap toward the environment, wherein injecting encapsulation material into the mold comprises injecting encapsulation material into the mold at a rate slow enough to cause the material to solidify after entering the gap and before passing through the gap into the environment. The rate may be selected based on an environment temperature and a temperature of the material.

Figure 1:
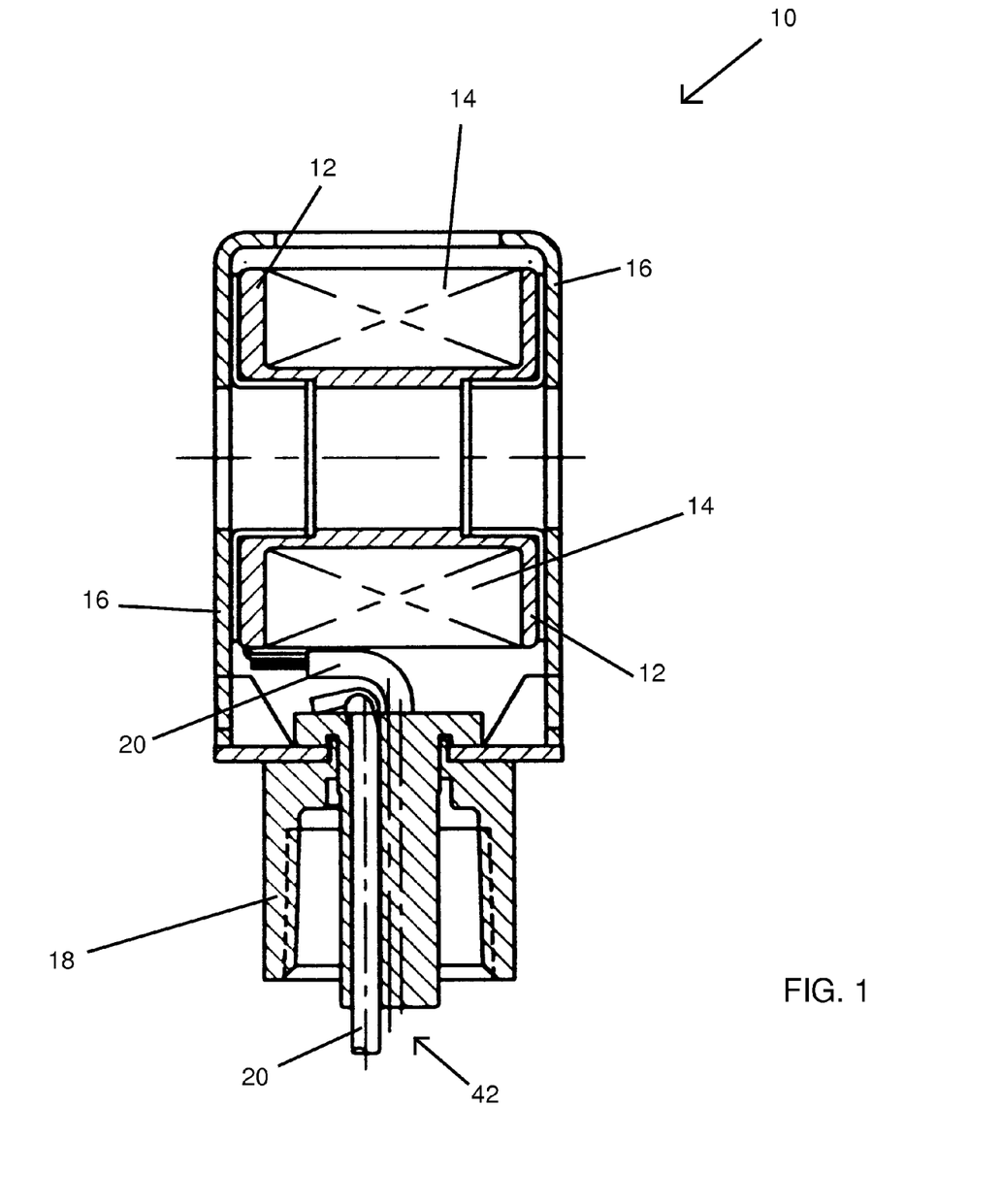
FIG. 1 illustrates a particular embodiment of a solenoid coil assembly, shown before encapsulation, utilizing certain aspects of the present inventions.

FIG. 1 is an illustration of a solenoid coil assembly 10, shown before encapsulation. The solenoid coil assembly 10 of the present invention is preferably designed to selectively actuate a solenoid controlled process control valve, as part of a process control system. However, the solenoid coil assembly 10 of the present invention may have other applications.

Figure 2:
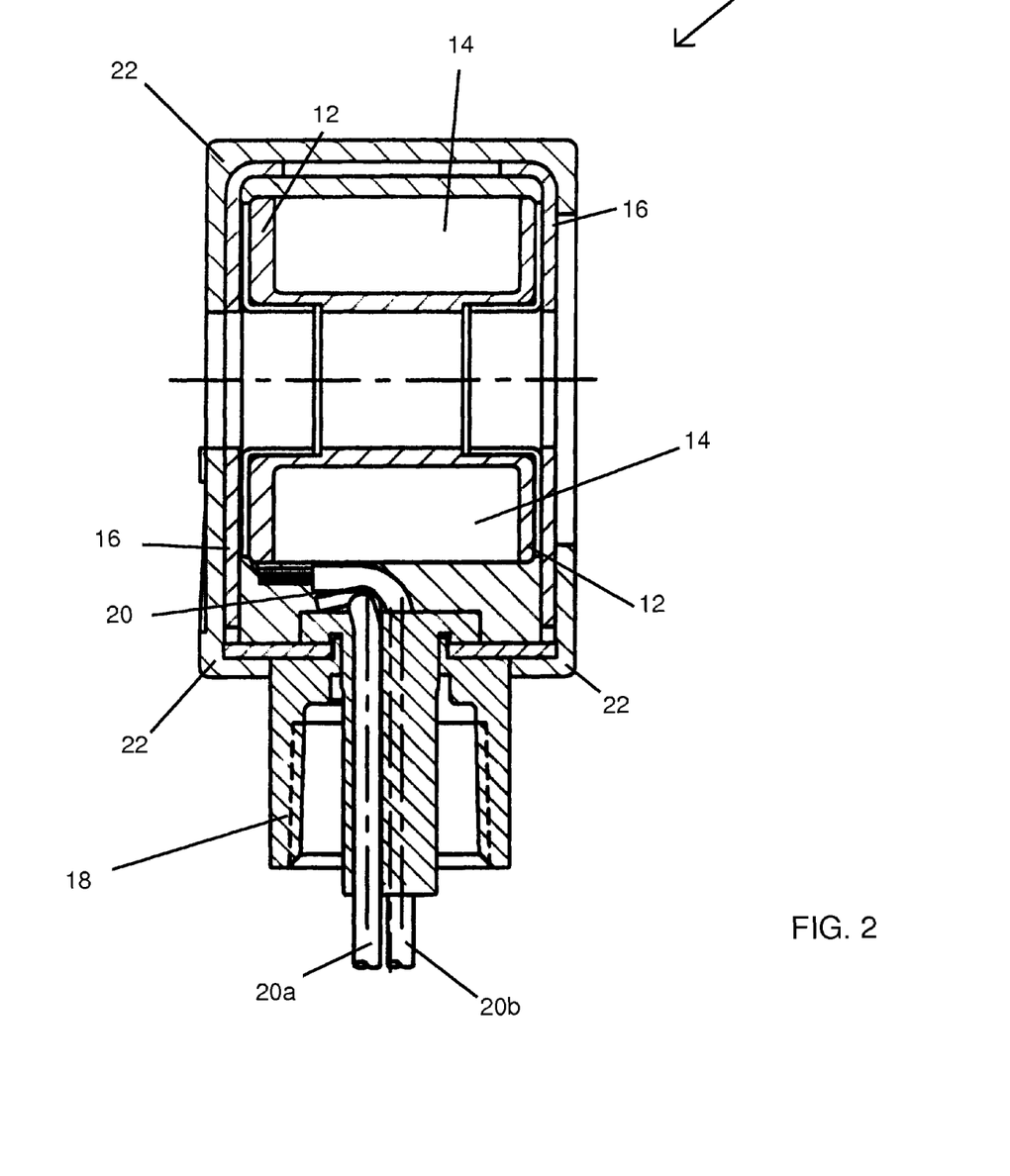
FIG. 2 illustrates the assembly of FIG. 1, shown after encapsulation.

In any case, the coil assembly 10 includes a bobbin 12 for supporting a coil 14, a frame 16 for housing the bobbin 12, and a collar assembly 18 to facilitate physical and electrical connections to the process control system. Referring also to FIG. 2, the coil assembly 10 of the present invention is preferably encapsulated in a plastic or polymer encapsulation material 22 to protect the coil 14 from the outside environment.

Figure 3:
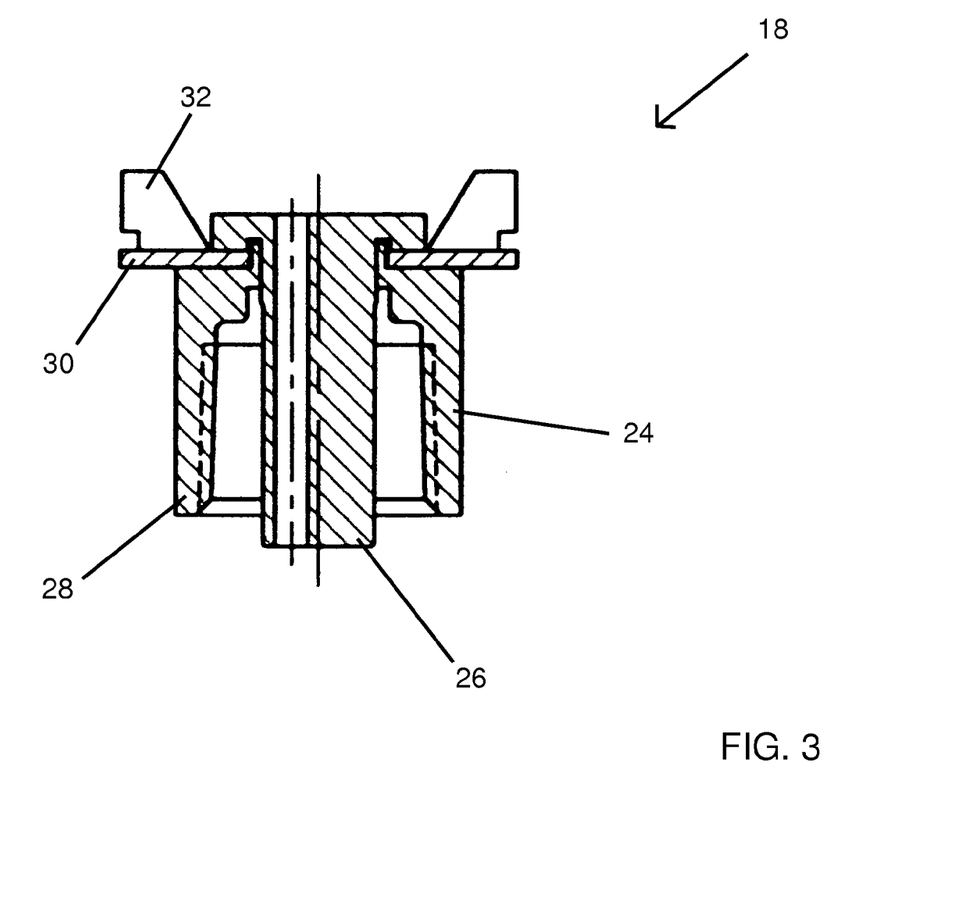
FIG. 3 illustrates a particular embodiment of a collar assembly utilizing certain aspects of the present inventions.

Referring also to FIG. 3, the collar assembly 18 preferably includes a collar 24 and a sleeve 26. The collar 24 preferably includes a cylindrical body 28 which may be threaded, internally or externally, in order to physically connect to electrical conduit. The collar 24 preferably includes a base plate 30 to rigidity secure one or more flanges 32 to the cylindrical body 28 of the collar 24. The flanges 32 may rigidly secure the collar assembly 18 to the frame 16.

Figure 4:
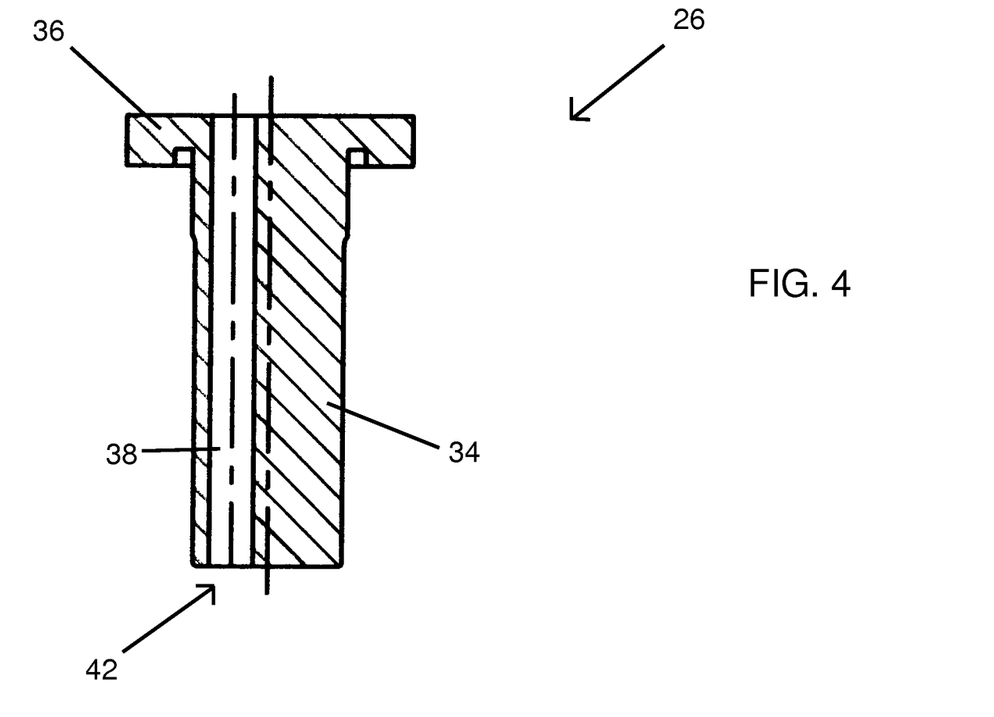
FIG. 4 illustrates a particular embodiment of a sleeve utilizing certain aspects of the present inventions.
Figure 5:
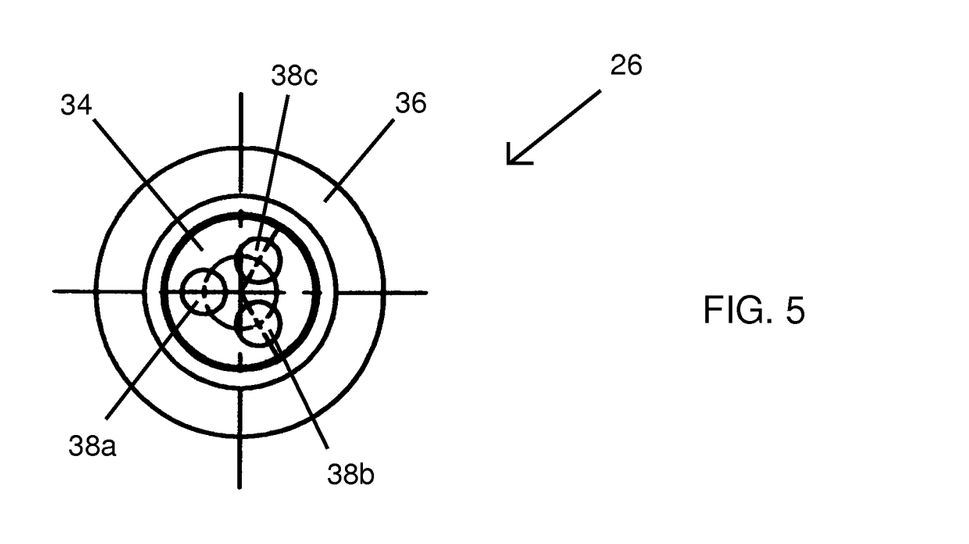
FIG. 5 illustrates an other view of the sleeve of FIG. 4.
Figure 6:
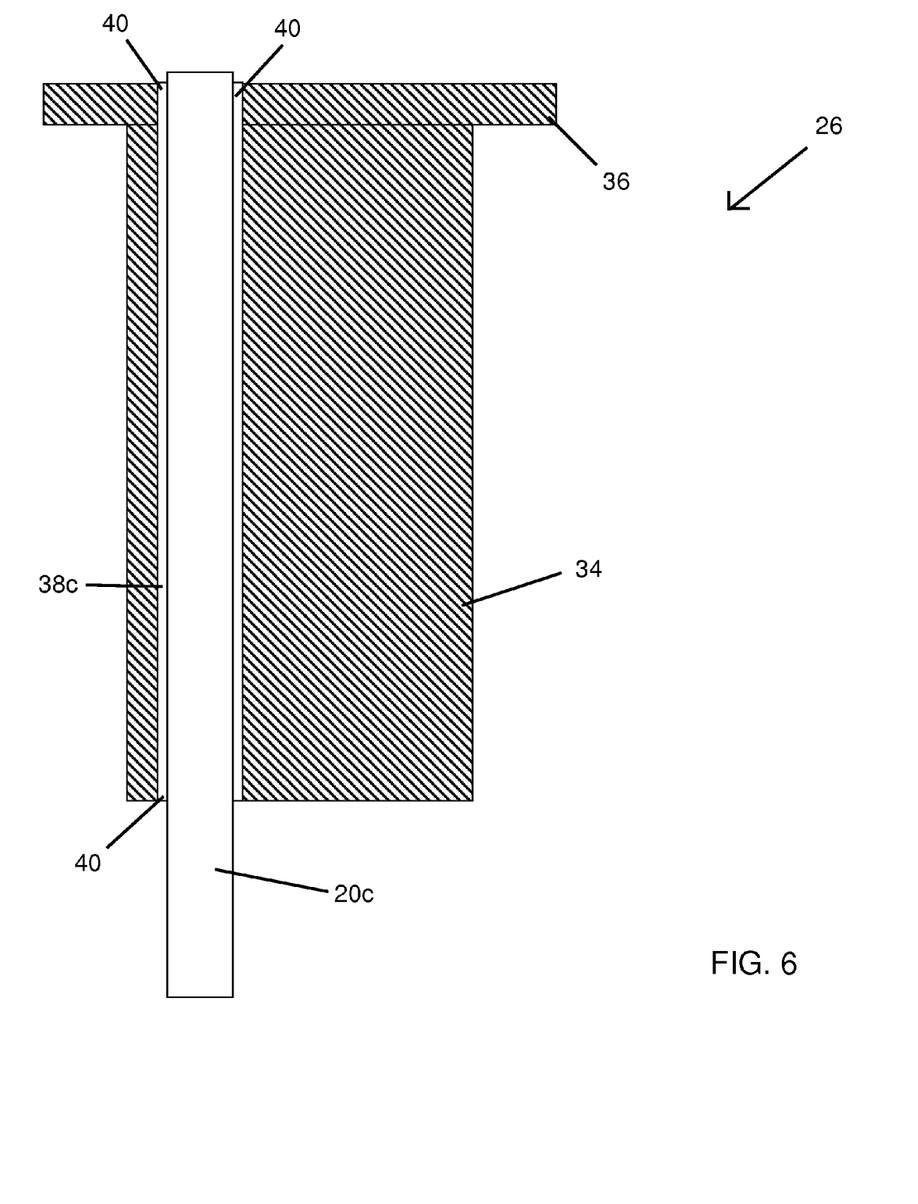
FIG. 6 illustrates the sleeve of FIG. 4 with an electrical lead passing therethrough.
Figure 8:
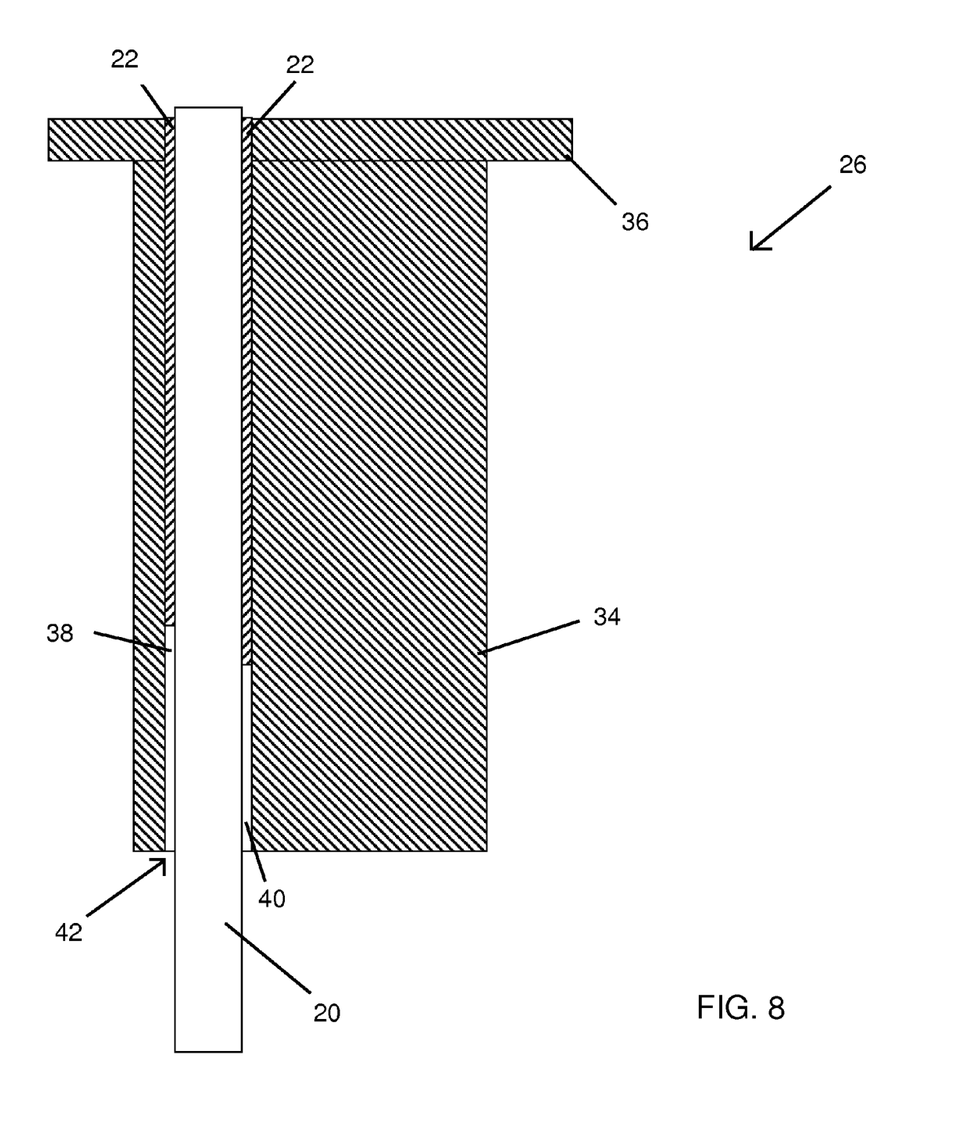
FIG. 8 illustrates an encapsulation material sealing between the sleeve of FIG. 4 and an electrical lead.

Referring also to FIG. 4 and FIG. 5, the sleeve 26 also preferably includes a cylindrical body 34 and a base plate 36 to rigidly secure the body 34 to the base plate 30 of the collar 24. The body 34 of the sleeve 26 preferably includes two or more tubes 38, 38a, 38b, 38c to receive the coil leads 20, 20a, 20b of the coil 14. As best seen in FIG. 6, the tubes 38, 38a, 38b, 38c are slightly larger in diameter, or cross-sectional area, than the coil leads 20, 20a, 20b, 20c. In other words, there are preferably gaps 40 between the tubes 38, 38a, 38b, 38c of the sleeve 26 and the leads 20, 20a, 20b of the coil 14, as shown in FIG. 8. These gaps 40 allow the encapsulation material 22 to flow therethrough, during the encapsulation process. As will be discussed in greater detail below, as the encapsulation material 22 flows through the gaps 40 between the tubes 38, 38a, 38b, 38c of the sleeve 26 and the leads 20, 20a, 20b of the coil 14, the encapsulation material 22 cools and solidifies before reaching a distal end 42 of each gap 40. This cooling and solidifying of the encapsulation material 22 seals the leads 20, 20a, 20b of the coil 14 to the sleeve 26 of the collar assembly 18, which is itself sealed to the frame by, and at least partially embedded within, the encapsulation material 22.

Figure 7:
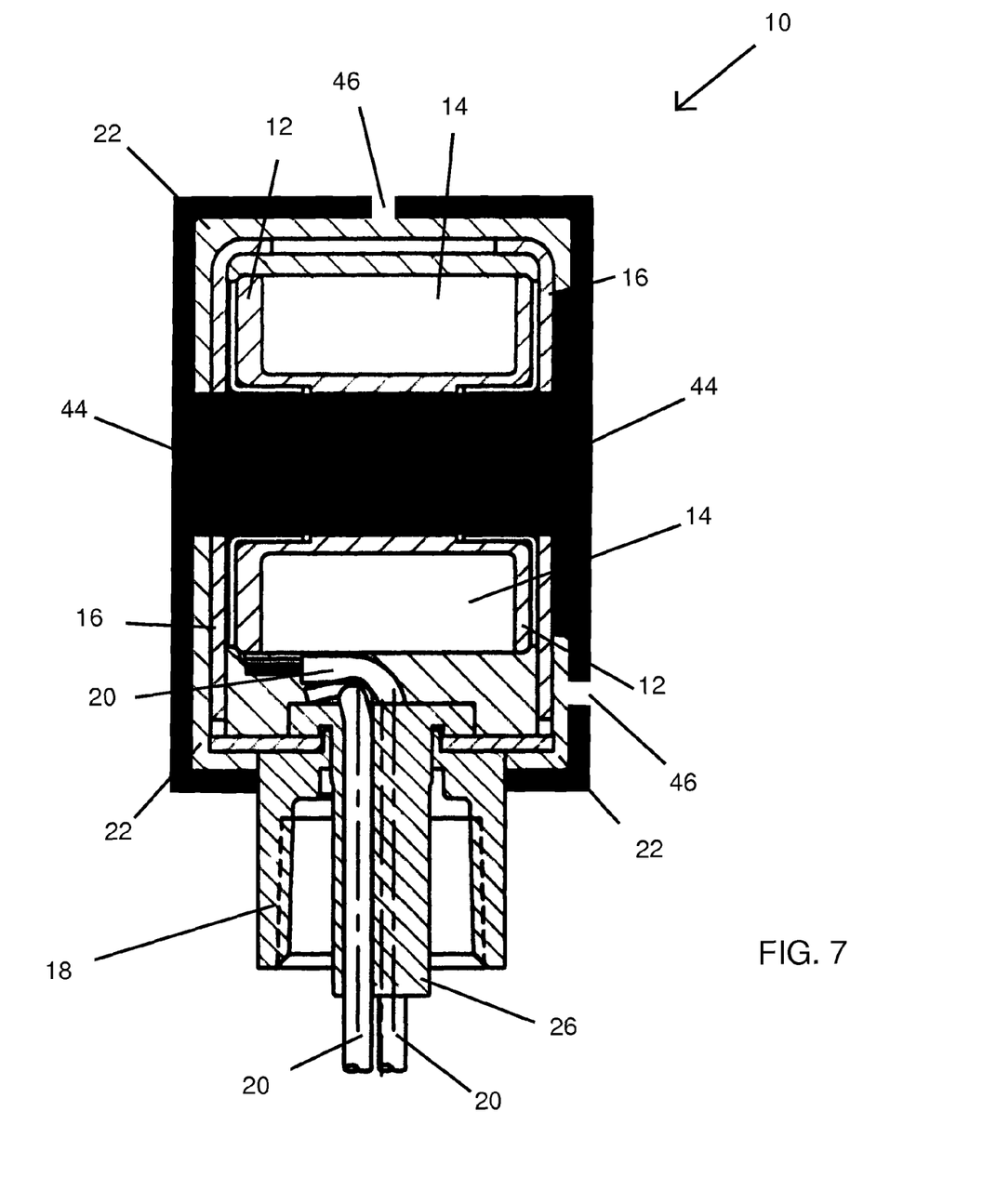
FIG. 7 illustrates the assembly of FIG. 1, shown in a mold after encapsulation, utilizing certain aspects of the present inventions.

More specifically, referring also to FIG. 7, the fully encapsulated solenoid coil assembly 10 of FIG. 2 may be achieved by placing the non-encapsulated solenoid coil assembly 10 of FIG. 1 into a mold 44. It should be understood that the frame 16 and/or the bobbin 12 may or may not be necessary, such that one need only place the coil 14 into the mold 44. In any case, the leads 20, 20a, 20b of the coil 14 are preferably placed in the tubes 38, 38a, 38b, 38c of the sleeve 26. At this point, mold 44 may be closed, or sealed, with the collar assembly 18 sealed or otherwise secured thereto.

As the encapsulation material 22 is injected into the mold 44 though one or more ports 46, in a liquid state, the encapsulation material 22 flows into spaces and interstices between the coil 14, the frame 16, the bobbin 12, and/or the collar assembly 18, thereby sealing the coil 14 within the encapsulation material 22 and protecting the coil 14 from moisture or other hazards of any environment in which it may be used.

Referring also to FIG. 8, as the encapsulation material 22 is injected into the mold 44 though one or more ports 46, in a liquid state, the encapsulation material 22 also flows out through the tubes 38, 38a, 38b, 38c of the sleeve 26 in the gaps 40 surrounding the leads 20, 20a, 20b, 20c of the coil 14. However, due to the rate at which the encapsulation material 22 is injected into the mold 44, the temperature at which the encapsulation material 22 is injected into the mold 44, the temperature of the environment surrounding the mold 44, the temperature of the mold 44, and/or the temperature of the assembly 10, the encapsulation material 22 cools and solidifies before reaching the distal end 42 of the gaps 40. In other words, the encapsulation material 22 cools and solidifies before flowing out of the distal ends 42 of the gaps 40 in the sleeve 26, thereby automatically sealing off the tubes 38, 38a, 38b, 38c and thus the mold 44.

Thus, the mold 44 need not be sealed to, or even in contact with, the leads 20, 20a, 20b, 20c of the coil 14. In a preferred embodiment, the mold 44 seals to the cylindrical body 28 of the collar assembly 18. Thus, the mold 44 need not even contact the leads 20, 20a, 20b of the coil 14 or the sleeve 26 of the collar assembly 18. As a result, the gaps 40 between the tubes 38, 38a, 38b, 38c of the sleeve 26 and the leads 20, 20a, 20b of the coil 14 may remain open to the environment, even after the mold 44 is closed and/or sealed. The present invention uses the cooling and solidification of the encapsulation material 22 as it flows through the gaps 40, to seal between the leads 20, 20a, 20b, 20c of the coil 14 and the tubes 38, 38a, 38b, 38c of the sleeve 26. As a result, the collar assembly 18 is self-sealing. Because the mold 44 need not be sealed to, or even in contact with, the leads 20, 20a, 20b, 20c of the coil 14, or the sleeve 26 of the collar assembly 18, the entire process is simplified and damage to the leads 20, 20a, 20b, 20c of the coil 14, and/or the sleeve 26, can be avoided.

Other and further embodiments utilizing one or more aspects of the inventions described above can be devised without departing from the spirit of Applicant's invention. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalency of the following claims.

What is claimed is:

1. A method of coil lead sealing during coil encapsulation, the method comprising steps of:
    positioning at least one lead of a coil into a tube having an inner diameter greater than an outer lead diameter so that a gap remains between the lead and tube;
    placing the coil into a mold having an injection opening;
    closing the mold so that an interior thereof remains open to an external environment surrounding the mold through the gap remaining between the lead and tube; and
    injecting liquid encapsulation material under pressure through the injection opening and into the closed mold interior so as to encapsulate the coil and flow from the mold interior through the gap and toward the external environment,
    wherein said injecting is conducted at an injection rate, encapsulation material temperature, external environmental temperature, mold temperature, and/or coil temperature causing the encapsulation material to solidify while flowing through the gap and before flowing out of a distal end of the gap into the external environment.

2. The method of claim 1, wherein said injecting is conducted at an injection rate slow enough to cause the encapsulation material to solidify before flowing into the external environment.

3. The method of claim 1, wherein said injecting is conducted at an encapsulation material temperature low enough to cause the encapsulation material to solidify before flowing into the external environment.

4. The method of claim 1, wherein said injecting is conducted at an external environmental temperature low enough to cause the encapsulation material to solidify before flowing into the external environment.

5. The method of claim 1, wherein said injecting is conducted at a mold temperature low enough to cause the encapsulation material to solidify before flowing into the external environment.

6. The method of claim 1, wherein said injecting is conducted at a coil temperature low enough to cause the encapsulation material to solidify before flowing into the external environment.

7. The method of claim 1, wherein the mold does not seal to the leads.

8. The method of claim 1, wherein the coil comprises a plurality of leads, and wherein said positioning comprises positioning each lead into each of a plurality of individual tubes, each tube having an inner diameter greater than a corresponding outer lead diameter so that a gap remains between each lead and corresponding tube.

9. The method of claim 8, wherein all tubes are disposed longitudinally within a single sleeve.

10. The method of claim 9, wherein said closing comprises sealing the mold to the sleeve.

11. The method of claim 9, wherein the sleeve is provided as part of a coil assembly which is at least partially placed into the mold.

12. The method of claim 11, wherein the assembly comprises a threaded collar and the sleeve therein.

13. The method of claim 12, wherein the collar comprises a base plate rigidly securing one or more flanges thereto, the flanges rigidly securing the collar assembly to a frame housing a bobbin supporting the coil.

14. The method of claim 13, wherein the encapsulation material at least partially surrounds and contacts each of the coil, frame, and collar.

15. The method of claim 11, wherein said closing comprises sealing the mold to the assembly.

* * * * *